UNITED STATES PATENT OFFICE 2,617,752

METHOD FOR DIELECTRIC R-F HEATING OF NONCONDUCTING MATERIALS IN PARTICULAR OF THERMOPLASTIC MATERIALS, WOOD, PAPER, ETC.

Hans T. von Hauteville, Stuttgart-Degerloch/Wurttemberg, Germany, assignor to International Standard Electric Corporation, New York, N. Y., a corporation of Delaware No Drawing. Application November 25, 1950, Serial No. 197,628. In Germany May 28, 1949

9 Claims. (Cl. 154—126.5)

The dielectric heating by R.-F. power of materials not, or poorly, conducting electricity is effected in an alternating electrical field. The electrodes, f. i. condenser plates, between which the electrical alternating field is set up, and between which the materials to be heated are brought, will not heat up under the alternating field. But if the electrodes, as is often the case rest on the dielectric to be heated without separation, possibly under pressure, heat is transferred by conduction from the dielectric to the electrode so it is equally heated. With regard to the dielectric to be heated such electrode heating represents a power loss.

To avoid this drawback, it is suggested under this invention with methods for dielectric R.-F. heating of non-conducting materials, in particular of thermoplastic materials, wood, paper, etc., that the materials to be heated are cooled down before the dielectric heating procedure.

Almost all dielectrics exhibit a strong decrease in the loss angle $tg\delta$, and almost also of the dielectric constant $(\epsilon)$, as the temperature goes down. Cold non-conductors are thus electrically superior to those in the warm state. On water, for instance, this temperature-dependence of the loss angle is very distinct. The loss angle of water in the solid phase, hence below 32° F., is considerably less than in the liquid state.

F. i. in glueing wood, in this new procedure those layers which are not adjacent to the glued joint, are cooled down to some temperature below freezing such as f. i. zero Fahrenheit. This cooling is preferably made in an extra cooling unit prior to placing the wooden parts between the electrodes.

By this cooling one wants to achieve that the layers immediately adjacent to the glued joint are not, or as little as possible, cooled, while those near the electrode are to be cooled as far down as possible. As such a complicated temperature pattern throughout the cross-section of the wood is difficult of attainment, all of the material is cooled to begin with, with the surface to be glued heated by a short-time high-intensity heat application, such as by a hot-air shower immediately prior to placing the wood between the electrodes. One thus accomplishes that the loss angle at the preheated surface considerably exceeds that of the undercooled portion of the wood.

This procedure offers the advantage that considerable savings of R.-F. power are achieved over the so far known R.-F. heating methods. Furthermore no humidity losses are encountered with humid wood. In spite of the additional power expended for cooling, power is saved on an overall basis, since for bringing down the loss angle of wood cooling to only about zero Fahrenheit temperature is required while the heating involves some 145 dgerees Fahrenheit. A thermal unit drawn from a refrigerator is much less expensive than one supplied by an R.-F. generator. Besides, the warm air gained in generator cooling is simultaneously used in a vaporizer-refrigerator for generating the desired cooling so no additional energy is consumed.

Even in heating thermoplastic materials, the new procedure offers considerable advantages, for many of these materials have the property to stiffen at temperatures about or below freezing. This is useful if a weld of a thick foil to a thin foil is intended. If the thick foil becomes too warm, hence too soft, all of the material will heat uniformly, to become uniformly plastic, apart from the boundary layer. Even if only the thin foil is pressed by a narrow welding electrode, and if the thick foil is allowed to rest on a wide electrode, experience shows that this results in a deep, groove-like seam. This unwelcome phenomenon is avoided by the new device, if by cooling the thick foil care is taken to ensure that sizeable dielectric heating takes place in it only in the immediate vicinity of the welded surface.

This new method may also be used with thermoplastic bodies other than laminated, if by a uniform supply of cold, i. e. by preferably quickly and intensely abstracting heat from outside, care is taken that a temperature gradient, as pronounced as possible, is present in the material towards the inside, so a plastic body can be more cured, polymerized or polycondensed inside than in its outer layers. As an example, a rod of thermoplastic material may thus be softened only inside in this manner.

This method described under this invention for cooling down poor conductors of electricity prior to R.-F. heating can be considerably simplified by the device that the materials to be heated are undercooled in the R.-F. equipment proper prior to heating.

One thus accomplishes that a high temperature is present in the interior of the material to be heated in particular in its center, while the material remains cool outside. To this end is used an electrode of high thermal capacity, made of material with a high specific heat. Metals which are particularly suitable for such electrodes have indeed a low specific heat. In order now to obtain an electrode with a high specific heat, the electrode is designed hollow in shape, and filled with a substance of high specific heat such as water. This results thus in an electrode with a relatively high specific overall heat.

In order to minimize electrode heat-up, an electrode of high specific heat may furthermore be provided with cooling fins or surfaces. More cooling can be achieved by forced air or liquid cooling. The prescribed methods may be applied single or some of them combined. The effect is even increased if air, gas, or liquid are used at temperatures below the ambient temperature.

In carrying out the method under the invention there is finally the possibility of applying means for controlling and/or directing the temperature before the actual dielectric heating process said means being in a position to create or control a temperature gradient within the material and thereby cause different parts of the material to have different dielectric constants. By said means e. g. temperature differentials can be created between the surfaces of material having the form of two sheets. When treating two sheets of which at least one is of thermo-plastic material it is often useful for the application of the method described to heat the two contiguous surfaces to different temperatures and said heating in such way that said surface of the thermoplastic material is at the higher temperature.

While I have described above the principles of my invention in connection with specific method and device for dielectric R.-F. heating of non-conducting materials, in particular of thermoplastic materials, wood, paper, etc. it is to be clearly understood, that this description is made only by way of example and not as a limitation to the scope of my invention as set forth in the objects and in the accompanying claims.

What I claim is:

1. A method of bonding a plurality of thermoplastic elements consisting of placing said elements between a pair of electrodes, cooling said elements and said electrodes substantially below ambient temperature, raising the surface temperature of portions of said elements to be joined, bringing the heated surfaces of said elements to be joined into engagement, and applying high frequency electrical energy to said electrodes whereby rapidly to additionally raise the surface temperature of said elements sufficiently to render the element material thermo-plastic and effect a bond between said elements without appreciably raising the temperature of remaining portions of said elements or the temperature of said electrodes.

2. The method of claim 1 wherein said elements and said electrodes are cooled below ambient temperature by means of refrigeration.

3. The method of claim 1 wherein the surface temperature of portions of said elements to be joined are heated by hot air.

4. The method of claim 1 whereby said elements and said electrodes are first cooled substantially below ambient temperature by means of refrigeration and the surface of said elements to be joined are heated by means of hot air directed over portions thereof.

5. The method of claim 1 wherein said elements are of water-containing wood material, said material being refrigerated to temperatures below freezing.

6. The method of claim 1 wherein said elements, cooled substantially below ambient temperatures have portions thereof intensely heated for a short time period prior to being joined and thermo-plastically welded by means of high frequency electrical energy.

7. The method of thermo-plastically bonding insulating material offering a high heat loss when subjected to a high frequency electrical field, consisting of providing a pair of electrodes adapted to encompass material to be bonded for application of high frequency energy thereto, cooling said elements and said electrodes to substantially below ambient temperature, rapidly heating surface areas of said elements to be joined, disposing said elements between said electrodes with said heated surface areas in contiguous engagement, and applying high frequency electrical energy to said electrodes to further heat said joined surfaces sufficiently to render the element material thermo-plastic and effect bonded engagement therebetween.

8. The method of claim 7 wherein said elements are maintained with the heated surfaces thereof in pressure engagement during application of said electrical energy.

9. The method of claim 7 wherein said electrodes are maintained in pressure engagement with said elements during application of the electrical energy.

HANS T. von HAUTEVILLE.

REFERENCES CITED

The following references are of record in the file of this patent:

UNITED STATES PATENTS

| Number | Name | Date |
| --- | --- | --- |
| 1,806,846 | Fox et al. | May 26, 1931 |
| 2,289,618 | Young | July 14, 1942 |
| 2,354,714 | Strickland | Aug. 1, 1944 |
| 2,550,006 | Dreyfus | Apr. 24, 1951 |

FOREIGN PATENTS

| Number | Country | Date |
| --- | --- | --- |
| 555,054 | Great Britain | Aug. 3, 1943 |